M. P. HATHAWAY.
Harvester Cutter.

No. 57,130.                        Patented Aug. 14, 1866.

Witnesses                        Inventor

UNITED STATES PATENT OFFICE.

M. P. HATHAWAY, OF MANKATO, MINNESOTA.

IMPROVEMENT IN CUTTING APPARATUS FOR HARVESTERS.

Specification forming part of Letters Patent No. 57,130, dated August 14, 1866.

*To all whom it may concern:*

Be it known that I, M. P. HATHAWAY, of Mankato, in the county of Blue Earth and State of Minnesota, have invented a new and Improved Cutting Apparatus for Grain and Grass Harvesters; and I do hereby declare that the following is a full, clear, and exact description thereof, which will enable those skilled in the art to make and use the same, reference being had to the accompanying drawings, forming part of this specification, in which—

Figure 1:
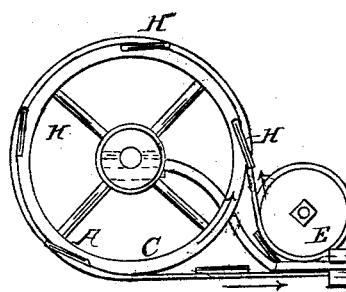
Figure 1:
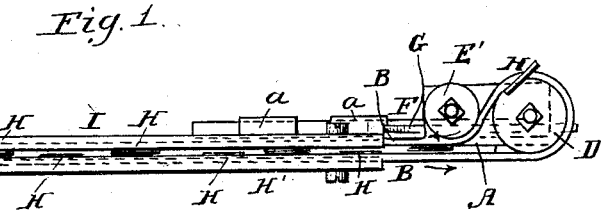
Figure 2:
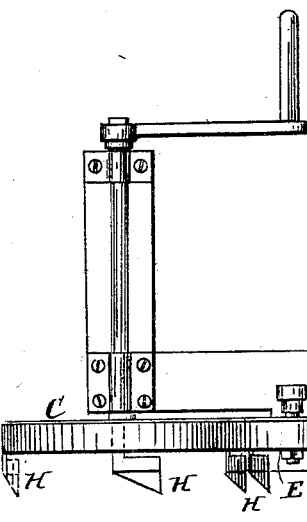
Figure 2:
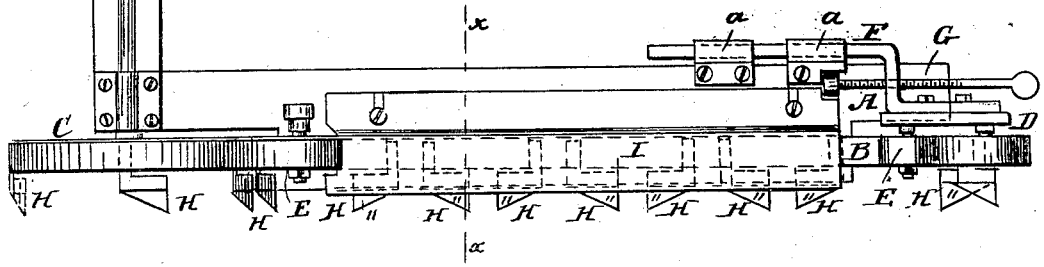
Figure 3:
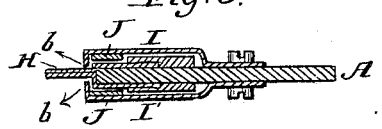

Figure 1 is a front view of my invention; Fig. 2, a plan or top view of the same; Fig. 3, a transverse vertical section of the same, taken in the line $x\ x$, Fig. 2.

Similar letters of reference indicate corresponding parts.

This invention is designed to supersede the ordinary reciprocating sickle now in general use on grain and grass harvesters; and it consists in having cutters attached to an endless apron placed at the front end of the platform or a suitable bar, the cutters being arranged in such a manner or made of such a form that they will work or pass each other with a drawing cut and operate similar to a pair of shears.

A represents the front part of a platform or a bar of a harvester, and B is an endless belt which works over wheels C D at the ends of the platform or bar A, the belt passing over and under the platform or bar A, as shown more particularly in Fig. 3.

The wheel C is considerably larger in diameter than the wheel D, in order to give the requisite speed to the belt; but the lower edges of both are in the same plane with the under surface of the platform or bar A, as shown in Fig. 1, and the upper part of the belt B is kept in contact with the upper surface of the platform or bar A by means of rollers E E', which bear upon the upper part of the belt, one near each end of the platform or bar A, as shown in Fig. 1.

The wheel D and roller E' at one end of the platform or bar A are connected to a sliding bar, F, fitted in guides $a\ a$ at the rear of the platform or bar A, and this bar may be adjusted by a screw, G, for the purpose of tightening the belt when necessary. (See Fig. 2.)

The belt B has a series of cutters, H, attached to it, the cutting-edges of which extend diagonally or obliquely out from the belt, (see Fig. 2,) and said cutters are formed with a bend, $b$, so that they may lap over the front edge of the platform or bar A, and admit of the cutters at the upper and lower parts of the belt working in contact with each other, as will be fully understood by referring to Fig. 3.

I I' represent two caps, which are secured, one, I, to the upper, and the other, I', to the under, surface of the platform or bar A. These caps extend nearly the whole length of the platform or bar A, between the rollers E E', and they are bent at their outer edges so as to lap over the shoulders or bends $b$ of the cutters, and serve as guides for the latter, causing them to work in contact, or preventing the upper and lower ones from spreading apart while cutting the grass or grain. This will be fully understood by referring to Fig. 3. Within each cap I I' there is secured longitudinally a bar, J, to keep the belt B in proper proximity with the platform or bar A.

The axis of the wheel C is connected by any suitable arrangement of gearing with one of the driving-wheels of the machine, and as the latter is drawn along the belt B will be moved in the direction indicated by the arrows, and the grain or grass cut between the cutters H, at the upper and lower parts of the belt B.

This device, it is believed, will operate smoothly and well, with less wear and tear and with less liability to clog than the reciprocating sickle now in general use.

Having thus described my invention, I claim as new and desire to secure by Letters Patent—

1. The endless cutting-belt B, provided with cutters H, having diagonal or oblique cutting-edges, and arranged, relatively with the platform or bar A, to operate in the manner substantially as and for the purpose set forth.

2. The combination of the belt B, wheel C, wheel D, rollers E, sliding bar F, guides $a\ a$, screw G, arranged and operating in the manner and for the purpose herein specified.

M. P. HATHAWAY.

Witnesses:
S. F. BARNEY,
MARK D. FLOWER.